I. F. NEWHALL.
COOKER.
APPLICATION FILED JULY 22, 1918.
1,309,444.
Patented July 8, 1919.
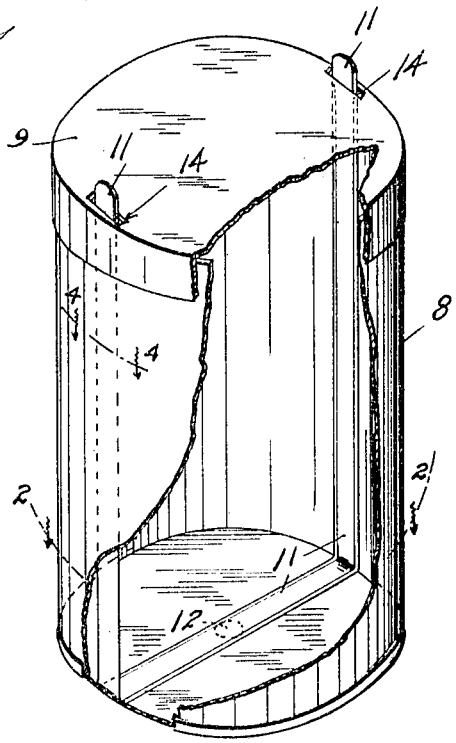
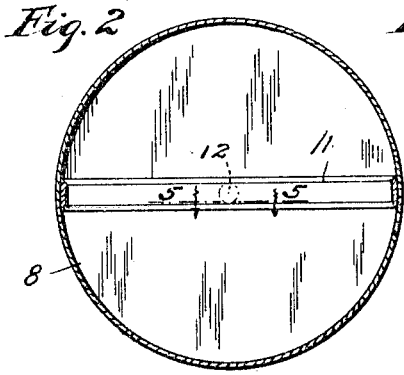
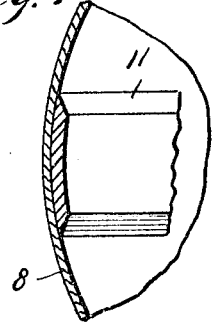
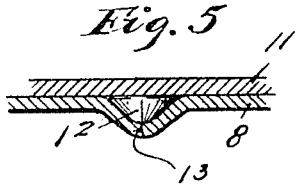
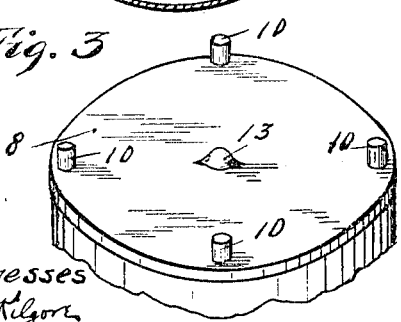
Witnesses
H. D. Kilgore
B. G. Baumann
Inventor
Ione F. Newhall
By her Attorneys
Williamson & Merbach

UNITED STATES PATENT OFFICE.

IONE F. NEWHALL, OF CRYSTAL BAY, MINNESOTA.

COOKER.

1,309,444.  Specification of Letters Patent.  Patented July 8, 1919.

Application filed July 22, 1918. Serial No. 246,133.

*To all whom it may concern:*

Be it known that I, IONE F. NEWHALL, a citizen of the United States residing at Crystal Bay, in the county of Hennepin and State of Minnesota, have invented certain new and useful Improvements in Cookers; and I do hereby declare the following to be a full, clear, and exact description of the invention, such as will enable others skilled in the art to which it appertains to make and use the same.

My invention relates to improvements in cookers and more particularly to steaming vessels or dishes for cooking brown bread and the like.

As is well known, a comparatively small amount of brown bread is cooked in this manner, on account of its tendency to stick to the vessel in which it is cooked and the difficulty of removing the same without breaking. This invention has for its primary object to provide means, whereby the steamed contents of a vessel may be readily separated or loosened therefrom, thus making it possible to quickly and easily remove said contents without breaking. The invention is also well adapted for cooking or chilling mush, jellied meats, ices, or any other food, which is formed in a loaf and thereafter sliced cold.

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a perspective view of the preferred form of the invention with some parts broken away and some parts sectioned;

Fig. 2 is a horizontal section taken on the line 2—2 of Fig. 1;

Fig. 3 is a fragmentary bottom plan view of the invention;

Fig. 4 is a detail view, principally in section, taken on the line 4—4 of Fig. 1, on an enlarged scale; and Fig. 5 is a detail view in section taken on the line 5—5 of Fig. 2, on an enlarged scale.

The numeral 8 indicates a cylindrical steaming vessel or dish that is capped by a removable flanged cover 9. The vessel 8 is supported in an elevated position on four short legs 10 that are permanently secured thereto. The purpose of these legs 10 is, of course, to support the vessel 8 above the bottom of a water-containing receptacle, not shown, in which it is placed, to permit a circulation of water thereunder, as well as around the vessel.

Within the vessel 8, is a U-shaped cutter bar or blade 11, the transverse portion of which rests directly upon the bottom of said vessel and the side members of which engage the side walls of the vessel at diametrically opposite points. Rigidly secured on the under side of the cutter bar 11, is a heavy conical trunnion 12, removably seated in a correspondingly formed seat 13 pressed from the bottom of the vessel 8 at the center thereof. By thus mounting the cutter bar 11, the same is securely held for rotation in the vessel, but with freedom for lifting movement therefrom, thus making it extremely easy to cleanse said vessel and cutter bar. Both edges of the cutter bar 11 are made sharp by beveling in a manner to bring the cutting edges of the bar in direct engagement with the bottom and side walls of the vessel 8, as best shown in Figs. 2 and 4.

The side members of the cutter bar 11 are extended above the top of the vessel 8 and the cover 9 is provided with two diametrically opposite slots 14, through which the free upper ends of said side members project, when the cover is in position on the vessel. By taking hold of the vessel 8 and cover 9 and rotating the same, with respect to each other, the cutter bar 11 may be caused to rotate within said vessel to separate therefrom the loaf of brown bread or other contents. As both edges of the cutter bar 11 are sharp, said cutter bar may be rotated in either direction.

As the cutter bar 11 is removable from the vessel 8 by lifting the same, it can be used in assisting in removing the cooked contents of the vessel by lifting on the upper ends of the side members thereof. The invention may also be used, in any desired number, in connection with a fireless cooker.

What I claim is:—

1. In a cooker, the combination with a vessel having an apertured cover, of a U-shaped cutter blade loosely seated in the vessel with freedom for lifting movement therefrom and closely engaging the sides and bottom thereof, the upper ends of the side members of the cutter blade being loosely inserted into the apertures in the cover, whereby said cutter blade may be rotated in the vessel by a turning movement of the cover thereon, and whereby said cover may be separated from the vessel and cutter blade by a lifting movement.

2. In a cooker, the combination with a vessel having an apertured cover, of a U-shaped cutter blade loosely seated in the vessel and closely engaging the sides and bottom thereof, and an axially located pivot and coöperating seat pressed, the one from the transverse portion of the cutter blade and the other from the bottom of the vessel, said pivot being separated from its seat by a lifting movement of the cutter blade, the upper ends of the side members of the cutter blade being loosely inserted into the apertures in the cover, whereby said cutter blade may be rotated in the vessel by a turning movement of the cover thereon, and whereby said cover may be separated from the vessel and the cutter blade by a lifting movement.

In testimony whereof I affix my signature in presence of two witnesses.

IONE F. NEWHALL.

Witnesses:
 CLARA DEMAREST,
 HARRY D. KILGORE.

Copies of this patent may be obtained for five cents each, by addressing the "Commissioner of Patents, Washington, D. C."